United States Patent [19]

Tawse

[11] 4,309,877
[45] Jan. 12, 1982

[54] TOTAL ENERGY SYSTEM INCLUDING MEANS FOR UTILIZING SUPPLEMENTARY HEATS

[75] Inventor: Ian S. Tawse, Downsview, Canada

[73] Assignee: Co-Gen, Inc., Miami, Fla.

[21] Appl. No.: 185,358

[22] Filed: Sep. 8, 1980

[51] Int. Cl.³ .......................................... F25B 27/02
[52] U.S. Cl. ................... 62/238.1; 60/618; 62/323.2; 62/500
[58] Field of Search ................. 62/323.4, 323.1, 238.1, 62/500, 323.2; 290/2; 60/618, 616; 237/12.3 R

[56] References Cited

U.S. PATENT DOCUMENTS

| | | | |
|---|---|---|---|
| 1,436,078 | 11/1922 | Bell ........................................ | 60/618 |
| 2,282,878 | 5/1942 | Newton ......................... | 62/323.1 X |
| 2,333,729 | 11/1943 | Miller et al. .................... | 62/323.4 X |
| 2,362,084 | 11/1944 | Miller .............................. | 62/323.1 X |
| 3,021,681 | 2/1962 | Perry .............................. | 62/323.2 X |
| 4,065,055 | 12/1977 | De Cosimo ........................ | 290/2 X |
| 4,164,850 | 8/1979 | Lowi, Jr. .......................... | 62/500 X |
| 4,250,715 | 2/1981 | Ratliff .............................. | 62/500 X |

*Primary Examiner*—William E. Tapolcai, Jr.
*Attorney, Agent, or Firm*—Alan H. Levine

[57] ABSTRACT

A prime mover of internal or external combustion type is utilized to furnish shaft work for the driving of an electrical generator, a refrigeration compressor and/or a combination of both. Waste heat emanating from the prime mover and/or a refrigeration system, of which said compressor is a component, is directed to provide utility heating and/or air conditioning, said heating and air conditioning thereby becoming useful byproducts of a means for generating electrical energy and/or furnishing refrigeration.

12 Claims, 11 Drawing Figures

LIQUID LEVEL

| SOLVENT | FREON TA | FREON TMC | FREON TMS |
|---|---|---|---|
| COMPOSITION | AZEOTROPE —<br>89%(WT) FREON 113<br>11%(WT) ACETONE | AZEOTROPE —<br>50%(WT) FREON 113<br>50%(WT) METHYLENE CLORIDE | BLEND —<br>94.05%(WT) FREON 113<br>5.70%(WT) METHANOL<br>0.25%(WT) NITRO—METHANE |
| DENSITY 77°F LB/CU. FT. | 87.78 | 88.65 | 92.21 |
| BOILING POINT °F | 110.5 | 97.2 | 103.5 |
| FREEZING POINT °F | −101 | −66 | −66 |
| HEAT CAPACITY BTU/(LB) 68°F<br>LIQUID<br>VAPOR | 0.305<br>0.210 | 0.261<br>0.152 | 0.236<br>— |
| LATENT HEAT OF VAPORATION AT BOILING POINT BTU/LB | 85.4 | 104.0 | 90.7 |
| SURFACE TENSION DYNES/CM 77°F | 18.7 | 21.4 | 17.4 |
| TOXICITY (TW)* PPM BY VOLUME<br>*O.H.S.A. 8HR TIME WEIGHED AVERAGE | 1000 | 600 | 475 |
| VAPOR PRESSURE P.S.I.A. 77°F<br>130°F | 7.35<br>22.0 | 9.7<br>27.0 | 8.3<br>25.0 |
| VISCOSTY LIQUID 77°F CENTIPOISE | 0.542 | 0.461 | — |

TOTAL ENERGY SYSTEM INCLUDING MEANS FOR UTILIZING SUPPLEMENTARY HEATS

BACKGROUND OF THE INVENTION

This invention is directed toward the conservation of energy and the decentralization of electrical power generation as well as the societal and economic benefits derivable from said primary aims. The concept of total energy systems is by no means new, and their present lack of impact, at a time of critically declining fuel supplies, when their efficiency advantages would do much to eleviate the problems associated with such shortages, is in part, due to the inability of designers to provide systems at reasonable costs which are capable of taking maximum advantages of waste heats at varying conditions of load and load types. This inadequacy of design concept is particularly obvious in total energy systems operated in domestic and light commercial applications where both heating and cooling needs exist, as well as a normal need for electrical energy.

Generally speaking, in such applications, electrical energy from the system's generator is used to power a conventional mechanical vapor compression type air conditioner and at which time a large portion of the system's waste heat remains unutilized. Such a system usually leads to a need for oversized drivers and generators, with the result of such concepts being high first costs, higher operating costs, and lower overall system efficiencies.

In the instance of this invention, and in an endeavor to dramatically improve the state of the art, a unique jet pump air conditioning means has been incorporated in the total energy system, such means being of low first cost and offering greatly extended trouble-free life as compared to mechanical vapor compression type equipment. Some of the advantages of the jet pump art incorporated in the invention include means whereby higher condensing temperatures and pressures can be tolerated and a unique flooded type evaporator. Other advantages contemplated in the heat pump system as laid forth in the specification, outlines the compounding of the normally wasted heat energies of the driver with the rejected heat of a mechanical vapor compression cycle refrigeration or air conditioning system with the recovered heat being utilized for utility purposes and/or the operation of a jet pump air conditioning system as previously discussed. This latter type of jet pump system would have its main use in commercial applications. Also contemplated is the utilization of a Stirling type driver for both power generation and compression cycle refrigeration or air conditioning systems with the attendant advantages inherent in this type of driver, such as low noise levels, durability, and low levels of pollution emissions. Provision is moreover incorporated in the total energy system as described in the specification to have the heat supply areas afore-described supplemented by the additional supply of waste heat, solar heat and/or direct combustion.

In all, four variants of the invention are described in the drawings and specification, and for ready identification of the variants dealt with, they shall hereinafter be referred to as Embodiments "A", "B", "C", and "D" respectively.

In Embodiment "A" of the invention, the primary waste heat source is furnished by an internal combustion engine and the system's air conditioning unit is of the jet pump type.

Embodiment "B" of the invention incorporates waste heat supply from an internal combustion engine with such heat source being compoundable by condenser heat rejected by a refrigeration or air conditioning unit of the mechanical vapor compression type. The final heat operated air conditioning unit is of the jet pump type.

Embodiment "C" of the invention is as described for Embodiment "A", except that the final heat operated air conditioning unit of the jet pump type has been replaced by an absorption type unit.

Embodiment "D" of the invention is as described for Embodiment "B", except that the internal combustion engine has been replaced by an engine of the Stirling type.

BRIEF DESCRIPTION OF THE DRAWINGS

FIG. 11 is a table reflecting general properties of certain solvents which can be used as refrigerants for the system's jet pump air conditioning unit.

DETAILED DESCRIPTION OF THE INVENTION

Figure 1:
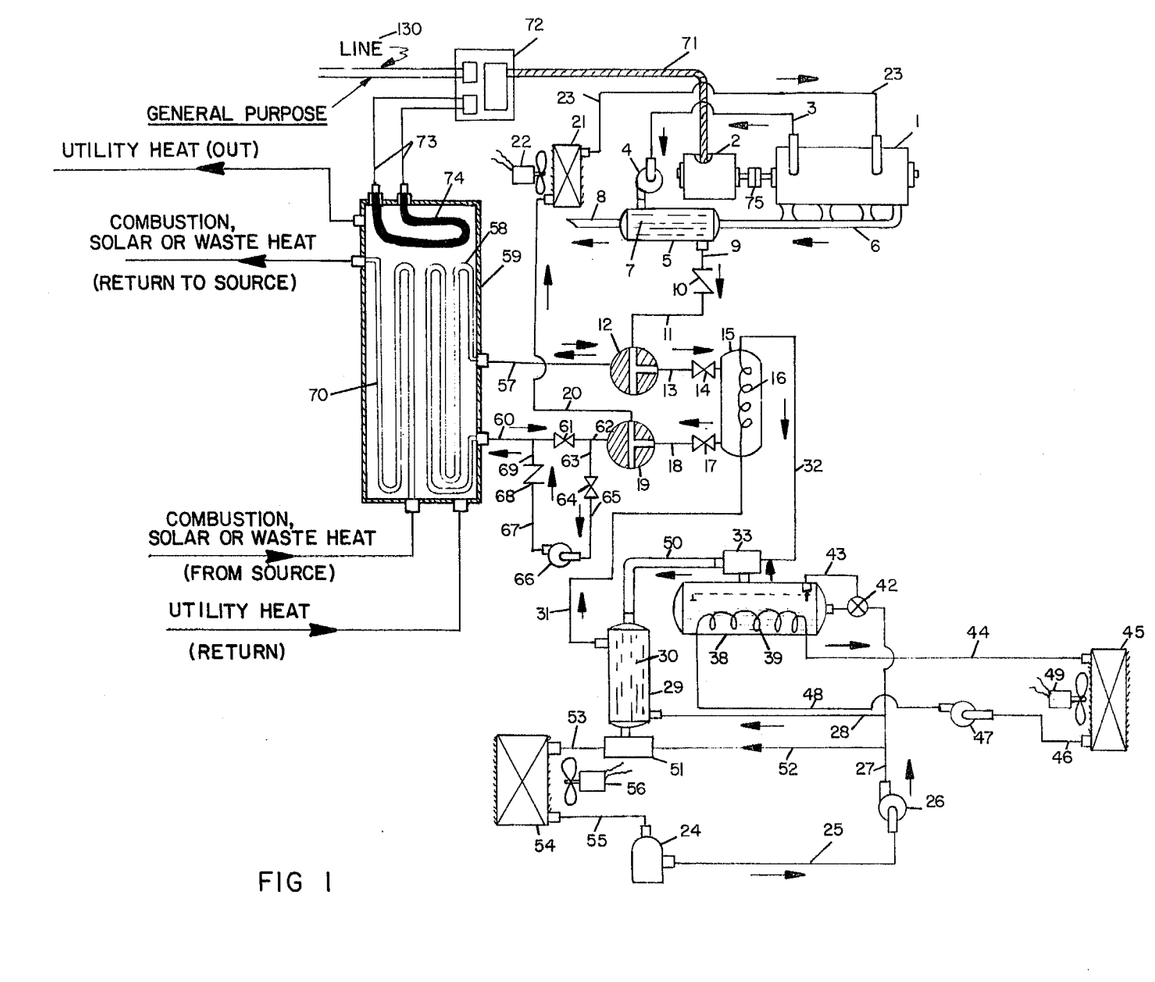
FIG. 1 is a schematic circuit drawing showing one embodiment of the invention and for identification reference to be known as Embodiment "A".

In FIG. 1 an internal combustion engine 1 of the liquid cooled type, is coupled by an electrical clutch 75 to an electrical generator 2. Upon the activating of the internal combustion engine 1 and the closing of the electrical clutch 75, the generator 2 is made to produce electrical energy which is directed through an electric supply line 71 to a load distribution center 72 from which the generated electrical energy being at desired conditions of voltage and current is directed by distribution control means (not detailed) to line 130 for the performance of useful general purpose work and/or via conductor 73 to an electric resistance heater 74 which is immersed in a heat transfer liquid (not shown) contained within a tank 59. The purpose of the said resistance heater 74 being to raise the temperature of the contained heat transfer fluid (not shown) for function to be described later in the specification. Additional to the utilization of the shaft work output of the internal combustion engine 1 as last described, a major portion of the heat energy losses of the internal combustion engine 1 are recovered in a manner as follows:

Water jacket heat emanating from the internal combustion engine 1 having been transferred to the engine's coolant (not shown), is drawn with the coolant through pipe 3 by pump 4 from which the heat enriched coolant is propelled through the shell side of heat exchanger 5 wherein it receives additional heat energy at a higher temperature by exchange with the higher temperature exhaust gasses emanating from internal combustion engine 1 which are passed to the inner tubes 7 of heat exchanger 5 by manifold 6. The exhaust gasses now at lowered temperature exit heat exchanger inner tubes 7 via tail pipe 8. Leaving the shell side of heat exchanger 5 through pipe 9, the heat enriched coolant originating at internal combustion engine 1 is passed through one way check valve 10 and pipe 11 to three way valve 12. With three way valve 12 having its fluid passages positioned as shown in FIG. 1, the hot coolant is directed through pipe 13, valve 14, and through the shell side of heat exchanger 15, wherein it gives up a major portion of its heat to heat exchanger coil 16, such heat as is then given up being used as motive energy for a jet pump air conditioning system to be described later in the specification.

Leaving heat exchanger 15, the coolant at lowered temperature is propelled through valve 17 and pipe 18 to three way valve 19. With three way valve 19 having its fluid passages positioned as shown in FIG. 1, the coolant is passed from said valve 19 through pipe 20 to heat exchanger coil 21 wherein heat energy at temperature in excess of a safe maximum for return to the engine (with such temperature excesses generally resulting from a lack of system heat demand) are dissipated via the medium of a thermostatically controlled motor-driven fan 22. From heat exchanger coil 21, the coolant is returned to internal combustion engine 1 for continuance of its circulation cycle via pipe 23.

In the deployment of the waste heat of the internal combustion engine 1 as last described, all recoverable waste heat is assumedly utilized for the operation of a jet pump air conditioning system, but in the event that comfort or process heating becomes a requirement preempting the need for air conditioning, the following procedure can be enacted in accordance with details reflected in FIG. 1 in order to divert the hot coolant flowing to heat exchanger 15 for the purpose of supplying the now needed heating medium.

With valve 14, located at the inlet to the shell side of heat exchanger 15 set in the closed position, and with the flow passages of three way valve 12 set so as to allow flow access from pipe 11 to pipe 57, the hot coolant originating at internal combustion engine 1 is channeled through pipe 57 and through coil 58 contained within tank 59, thereby transferring heat to a heat transfer fluid contained within said tank 59. In this manner a reservoir of heat is created and made available for utilitarian heating purposes. Having given up a portion of its heat as afore-described, the lowered temperature coolant is returned to the internal combustion engine 1 by way of pipe 60, valve 61, pipe 62, three way valve 19, pipe 20, heat exchanger 21, and pipe 23. In order to accommodate this last condition of flow, valve 61 would be in an open setting, valve 19 would have its flow passages oriented to allow fluid flow from pipe 62 to pipe 20. Valves 17 and 64 would be in the closed position as would back check valve 68.

In a situation where a need for air conditioning exists, and with heat energy being delivered to heat exchanger 15 as previously described, the air conditioning components of the total energy system functions as follows:

A predetermined quantity of a refrigerant such as Freon 11, with a substantial quantity of said refrigerant being maintained within a liquid reservoir 24 is introduced within a closed loop, said loop having previously been evacuated of non-condensable fluids.

Figure 4:
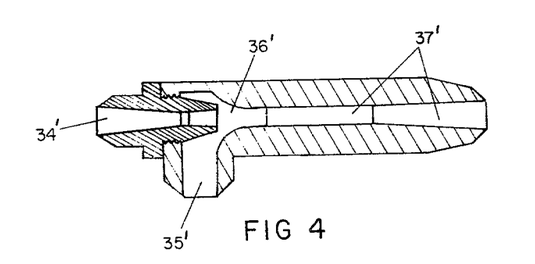
FIG. 4 is a longitudinal sectional view of an ejector as typically referred to in reference to the invention's jet pump air conditioning system. Details shown are illustrative of ejector principles only.

Upon the activating of pump 26, liquid refrigerant is drawn from liquid reservoir 24 through pipe 25 by said pump 26, which then discharges the refrigerant into pipe 27, a portion of said refrigerant in turn being propelled through branch pipe 28 and through the shell side of heat exchanger 29 wherein the refrigerant receives heat from a warmer fluid flowing through the tubes 30 of said heat exchanger 29. Leaving heat exchanger 29, the now warmer refrigerant is propelled through pipe 31 and heat exchanger coil 16 contained within heat exchanger 15. In the course of its passage through heat exchanger coil 16, which heat acts to vaporize the refrigerant and raise its vapor pressure to a sufficiency such as would provide the motive force required to operate an ejector as illustratively shown in FIG. 4. Successive to the refrigerant having attained operative pressure in heat exchanger coil 16, the said refrigerant is channeled through pipe 32 and enters ejector 33 through the ejector nozzle 34' as shown in FIG. 4. At this time, the pressure head of the motive fluid (refrigerant) is converted to a high velocity stream which then enters the suction chamber 35' of the ejector 33 via the discharge side of the nozzle 34'. At this time a pumping action commences when gasses contained within the suction chamber 35' are entrained by the entering high velocity jet stream, thereby creating a lowering of pressure in the suction chamber 35' and causing a portion of a quantity of refrigerant contained in a flooded type evaporator 38 (which has an outlet connected to the suction chamber of ejector 33) to be evaporated at a low absolute pressure, thereby lowering the temperature of the remaining refrigerant contained within the evaporator 38 to such level whereby useful cooling effect can be obtained from said refrigerant when a means (to be described latter in this specification) is provided for the deployment of such cooling effect. In the process as last described, the evaporate drawn from the evaporator 38 by the suction action of the ejector 33 now becomes entrained and mixed with the motive fluid in the ejector mixing section 36'.

The resultant mixture, at a temperature below that of the motive fluid, is now compressed in the ejector's diffuser section 37' and discharged into pipe 50 at a pressure higher than that of the ejector's suction, but lower than that of the motive fluid.

While ejectors of the type last described utilizing hot gas or a motive fluid have been found to operate reasonably well in single fluid jet pump air conditioning systems, when using such high boiling point refrigerants as Freon 11 and Freon 113, high back pressures exerted on the ejector as a result of unfavorable condensing conditions cause rapid declines in system efficiencies.

It has also been found that liquid operated ejectors are capable of less impaired function against higher back pressures than gas operated ejectors and in order to obtain higher system efficiencies, an ejector of the liquid operated type has been incorporated in the invention additional to the gas operated type previously described in the specification.

By again referring to FIG. 1, it will be seen that pipe 27 being a discharge line from liquid refrigerant pumping means 26, has a branch pipe 52 through which liquid refrigerant under motivation from pump 26 is made to flow to a liquid operated ejector 51, said ejector 51 in general principle of function being similar to ejector 33, previously described in the specification.

In function, ejector 51, under motivation of the liquid refrigerant being propelled through pipe 52 at the system's condensing temperature creates a lowered pressure at its suction inlet, said inlet being connected to the tube side outlet of heat exchanger 29 and whereby the said ejector 51 receives the refrigerant fluid being discharged by ejector 33 through pipe 50 and the tubes 30 of heat exchanger 29, thereby complimenting and compounding the work performed by ejector 33. In consideration of heat exchanger 29, it will be apparent that the said heat exchanger implements three useful functions in that it returns part of the heat energy required to operate ejector 33, to heat exchanger 15 for recycling of said heat energy; reduces the volume of the hot gas being discharged from ejector 33, thereby increasing the work potential of ejector 51; and, moreover, serves to reduce the volume and cooling flow of the air conditioning system's condenser 54, said condenser 54 being designed to receive the total refrigerant discharge of ejector 51 via pipe 53 and achieve final condensing of the system's refrigerant and motive gas by the combined means of pressure from ejector 51 and heat removal affected by motor operated fan 56. The condensed or liquified refrigerant leaving the discharge side of condenser 54 is returned to liquid reservoir 24 by way of pipe 55 for continuance of the air conditioning unit's cycle.

Figure 2:
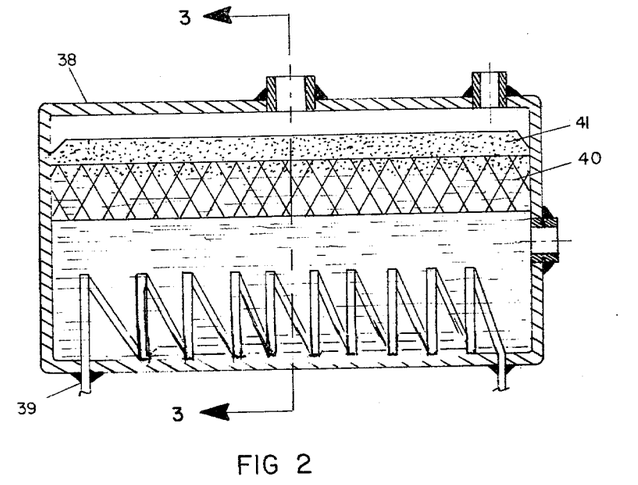
FIG. 2 is a longitudinal sectional view of a flooded type evaporator applicable to Embodiments "A", "B", and "D" of the invention.
Figure 2:
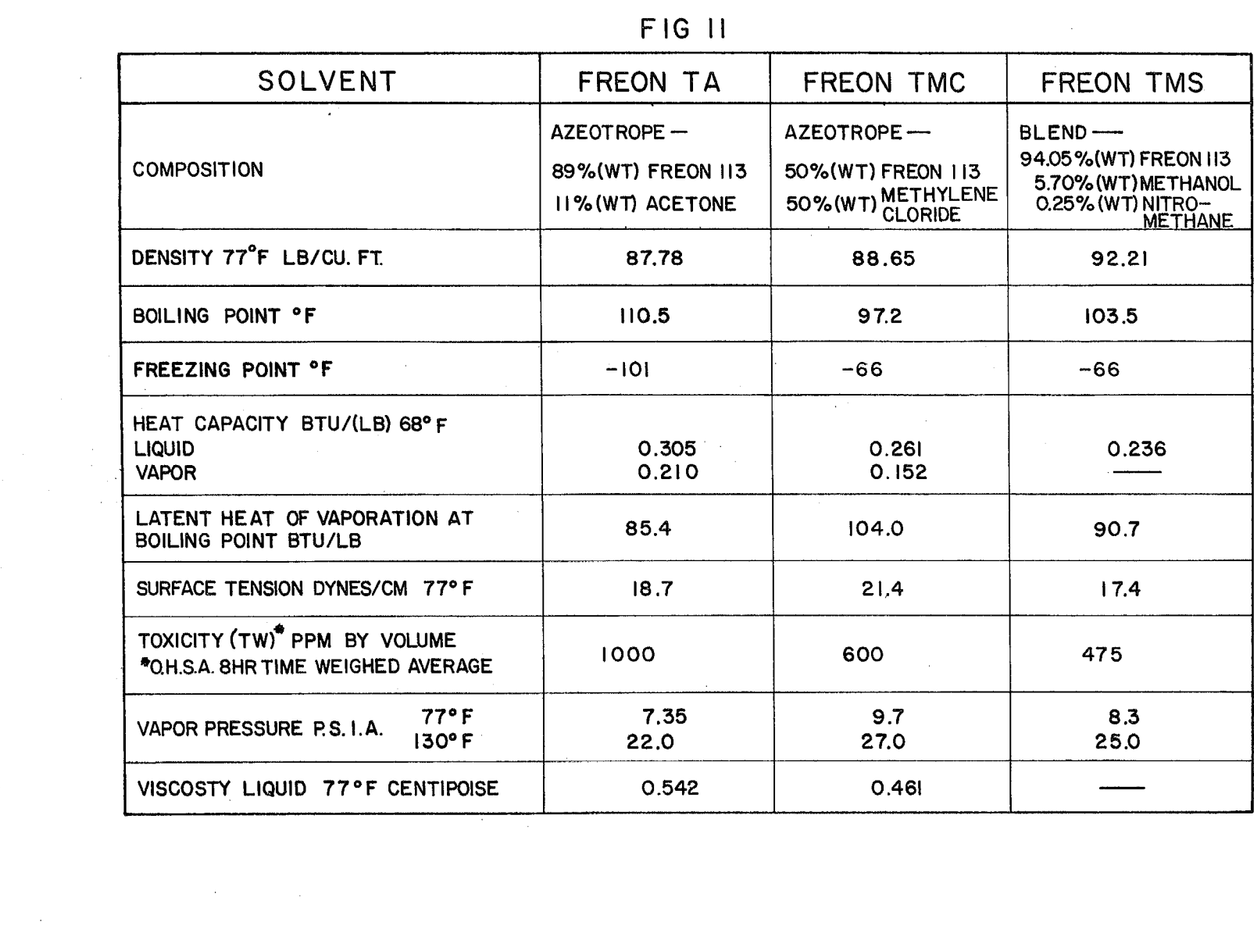
Figure 3:
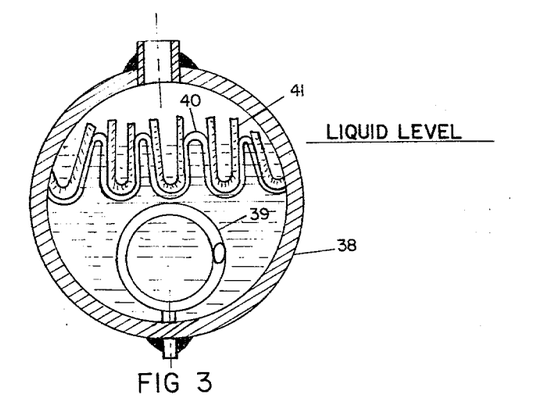
FIG. 3 is a cross-sectional view taken on Line 3 of FIG. 2.

In explanation of the operation of the jet pump air conditioning unit's flooded type evaporator, enumerated in general 38, by referring to FIGS. 2 and 3, it will be noted that this is a cylindrical tank containing the following sub-components—a formed wire mesh screen 40 supporting a series of woven wicks 41 and a heat transfer coil 39. In function, a quantity of liquid refrigerant is fed by liquid pumping means 26 through pipe 27 to flow regulator 42, said regulator 42 acting to maintain a predetermined level of liquid within said evaporator 38 in response to a liquid level sensing device 43. In purpose of function the woven wicks 41 serve by capillary action to expose an extended liquid surface to the vacuum created by the suction chamber of ejector 33, thereby speeding the process of the refrigerant's evaporation and moreover serving to circumscribe the event of liquid carryover often associated with flooded evaporators having spray nozzles or flowing sheets of liquid. Transfer of cooling effect produced within the evaporator 38 to the space to be cooled is achieved in the following manner: a closed loop containing a heat transfer fluid (not shown) is propelled by pump 47 through pipe 48 and through heat exchanger coil 39 whereupon the head load of the space being cooled is transferred to the chilled refrigerant contained within evaporator 38. Exiting heat exchanger coil 39 via pipe 44, the now chilled heat transfer fluid is returned to pump 47 for continuance of the cycle by way of heat exchanger coil 45 and pipe 46.

In the course of the heat transfer fluid's passage through heat exchanger coil 45, the heat load of the space to be cooled is transferred to said fluid via the mediums of motor operated fan 49 and said heat exchanger coil 45.

In review of the foregoing description and illustrative example portrayed with regard to Embodiment "A" of the invention, it will be apparent to those skilled in the art that a practical means has been demonstrated whereby high thermal efficiencies become obtainable from a prime mover of the type dealt with in the foregoing, inasmuch as the prime mover, in addition to performing its normal function of shaft work output, can be made to provide heating and/or air conditioning. It will also be apparent that it is not an essential of the heating and cooling system modes that all or any part of the generator's electrical output be routed as indicated to furnish heating of the fluid contained within tank 59 but rather the indicated routing provides a convenient and energy efficient means of maintaining a load on the driver during periods of low demand for the herein termed "General Purpose" electrical output; and in an operating unit in most instances, electrical flow for the heating of the fluid contained within tank 59 would be by controlled staging of a multiplicity of electrical resistance heaters contained within tank 59, with the maximum accumulative electrical input to such resistance heaters being equal to the maximum output of the system's electrical generator. Further increased system efficiency can moreover be achieved by optimizing the heat storage capacity of tank 59 and/or by resort to storage of the system's electrical production.

In a condition of required system operation wherein a need exists for the waste heat emanating from the internal combustion engine 1 to be deployed for the supply of heat energy to the system's jet pump air conditioning unit simultaneous with the supply of heat to the principal heat transfer fluid contained within tank 59, in order to supply utilitarian heat, the following procedure would be enacted—with heat enriched coolant flowing from internal combustion engine 1 to three way valve 12, said three way valve 12 would have its flow passages so oriented as to allow access from pipe 11 to pipes 13 and 57, valve 14 would be set in an intermediate flow volume position, valve 17 would be set in an open position, three way valve 19 would have its flow passages oriented so as to allow flow access from pipes 18 and 62 to pipe 20, valves 64 and 68 would be set in a closed position and valve 61 would be set in an intermediate flow volume position. In this last described manner of flow control it will be apparent that the hot coolant flowing from pipe 11 can be proportioned for flow to both heat exchanger 15 and heat exchange coil 58 thereby implementing the simultaneous system functions of cooling and heating.

By again referring to FIG. 1 it will be discernable that additional to the system's heat supply from the internal combustion engine 1, provision has been illustratively provided to have such heat supply supplemented or substituted for by the heats of direct combustion, solar heat, and/or waste heats from other sources. In practice, such heats, having been absorbed by a heat transfer fluid (not shown), are conveyed by means (not detailed or enumerated) to a heat transfer coil 70 contained within tank 59, such coil 70 acting to transfer the conveyed heat to the principal heat transfer fluid contained within said tank 59. In order to utilize the heat transferred to the principal heat transfer fluid contained within said tank 59, as last described, for the purpose of operating the system's jet pump air conditioning unit, three way valve 12 would have its flow passages oriented in such manner as to allow open access between pipes 13 and 57, three way valve 19 would have its flow passages set so as to allow open access between pipes 18 and 62. While circumventing flow from said pipes to pipe 20, valves 14, 17 and 64 would be set in an open position, while valve 61 would be set in a closed position. With valve settings as last described, pump 66 would be activated and a contained heat transfer fluid (not shown) would be propelled from said pump 66 through pipe 67, one way valve 68, pipes 69 and 60 and through heat transfer coil 58 wherein the propelled heat transfer fluid receives heat from the principal fluid contained in tank 59, said heat being carried with the propelled heat transfer fluid through pipe 57, three way valve 12, pipe 13, valve 14 and heat exchanger 15 wherein a portion of the heat contained in the propelled fluid is transferred to heat exchanger coil 16 for the purpose of providing motive energy to the system's jet pump air conditioning unit as previously described. Leaving heat exchanger 15 via valve 17, the propelled fluid is returned to pump 66 for continued circulation by way of pipe 18, three way valve 19, pipes 62 and 63, valve 64 and pipe 65.

In order to utilize heat accumulated in the principal fluid contained in tank 59 for purposes of utilitarian heating rather than air conditioning, a figurative circulatory system is indicated in FIG. 1. In practice, this would involve a fluid circulating loop including a fluid propelling means and a heat exchanger located in the space or medium to be heated, and whereby transfer of heat from the said principal heat transfer fluid to the space or medium to be heated could be effected.

Figure 5:
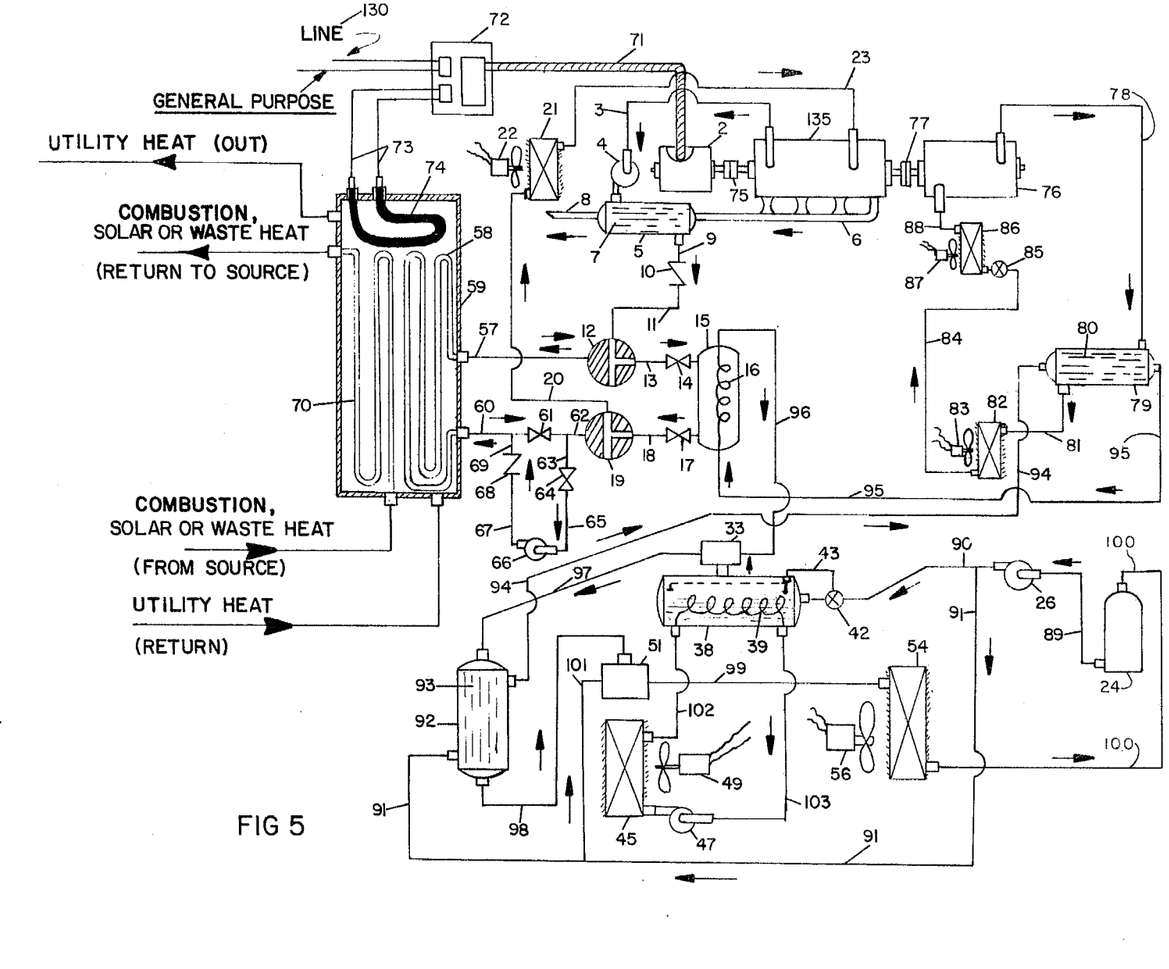
FIG. 5 is a schematic circuit drawing of Embodiment "B" of the invention.

In Embodiment "B" of the invention as shown in main in FIG. 5, an additional means of air conditioning or refrigeration has been added to the system, as well as an additional supply of waste heat, said supply of waste heat comprising a portion of the heat rejected by the system's added air conditioning or refrigeration unit, during said unit's condensing process.

In accordance with FIG. 5, a mechanical refrigeration compressor 76 of reciprocating or rotary type is coupled by an electric clutch 77 to one end of the crankshaft of a liquid cooled internal combustion engine 135, the other end of said crankshaft being coupled by electric clutch 75 to an electric generator 2 as previously described. Upon the activating of internal combustion engine 135 and the closing of electric clutches 75 and 77, the system's generator 2 and a fairly conventional mechanical vapor compression refrigeration cycle involving the use of a refrigerant such as ammonia, Freon 12 or Freon 22 is placed in operation. The said refrigeration cycle performs its process function in accordance with the following: A quantity of liquified refrigerant contained in the lower elevational tubes of air cooled condensor 82 is propelled by the pumping action of compressor 76 through pipe 84 and expanded through expansion valve 85 into evaporator 86 wherein the realized cooling effect of evaporation makes possible the absorption of heat by the refrigerant from the space or medium to be cooled, with the heat load from said space or medium to be cooled being transferred to the circulating refrigerant via motor operated fan 87 and the heat transfer elements of evaporator 86. Leaving evaporator 86, the heat enriched refrigerant in vapor phase is channeled to compressor 76 via pipe 88. In the process of its passage through compressor 76 the gaseous refrigerant by compressive action is raised in temperature and pressure prior to being propelled through pipe 78 to heat exchanger 79 wherein the higher temperature of the heat contained in the refrigerant gas is given up to a second fluid being moved through heat exchanger tubes 80, said second fluid being the motive fluid functioning to power the system's jet pump air conditioning unit's ejector 3, and thereby furnishing an additional supply of waste heat energy for operating the said jet pump air conditioning unit. Having given up a portion of its higher temperature heat in heat exchanger 79, the circulating refrigerant still in gaseous state exits the shell side of said heat exchanger 79 by way of pipe 81 and is returned to air cooled condensor 82 wherein a further portion of its heat is removed by air flow emanating from motor operated fan 83, whereupon, having attained appropriate conditions of temperature and pressure, the refrigerant is returned to liquid phase for continuance of its cycle.

With respect to the function of the system's jet pump air conditioning unit appropriate to Embodiment "B" of the invention, this remains in all respects identical to that described for Embodiment "A" of the invention, except that an additional means of heat collection has been interposed upstream of heat transfer coil 16, said additional means of heat collection being heat exchanger tubes 80. Except as herein described under Embodiment "B" of the system, all other aspects of said Embodiment "B" remain substantially as described under Embodiment "A" except that due to necessary re-routing of the schematic circuitry, certain changes in drawing reference numerals have been made in accordance with the following: pipe 25 of Embodiment "A" has been re-enumerated 89; pipe 27 has been re-enumerated 90; pipe 28 has been re-enumerated 91; pipe 52 has been re-enumerated 101; pipe 53 has been re-enumerated 99; pipe 55 has been re-enumerated 100; heat exchanger 29 has been re-enumerated 92; heat exchanger tubes 30 have been re-enumerated 93; pipe 31 has been re-enumerated 94 and has had its terminus location changed in order to facilitate heat recovery from heat exchanger tubes 80; pipe 95 is an added pipe serving to convey heat from heat exchanger tubes 80 to heat exchanger coil 16; and, pipe 32 has been re-enumerated 96.

Also in Embodiment "B" of the invention (and strictly to facilitate illustration of circuitry, with the principle of function remaining as for Embodiment "A") the closed heat transfer circuit serving to convey the cooling effect created in the jet pump air conditioning unit's evaporator 38, to the space or medium to be cooled, has been re-oriented as follows: the heat transfer fluid contained within the closed circuit and being as a subambient temperature is propelled by pump 47 through heat transfer coil 45 wherein it receives the heat load of the space to be cooled via motor operated fan 49. Exiting heat transfer coil 45, the now warmer fluid is propelled through pipe 102 to heat transfer coil 39 contained within evaporator 38, wherein the heat load is transferred to the cold refrigerant within said evaporator 38, and the now chilled heat transfer fluid is returned through pipe 103 to pump 47 for continuation of the cycle.

Figure 6:
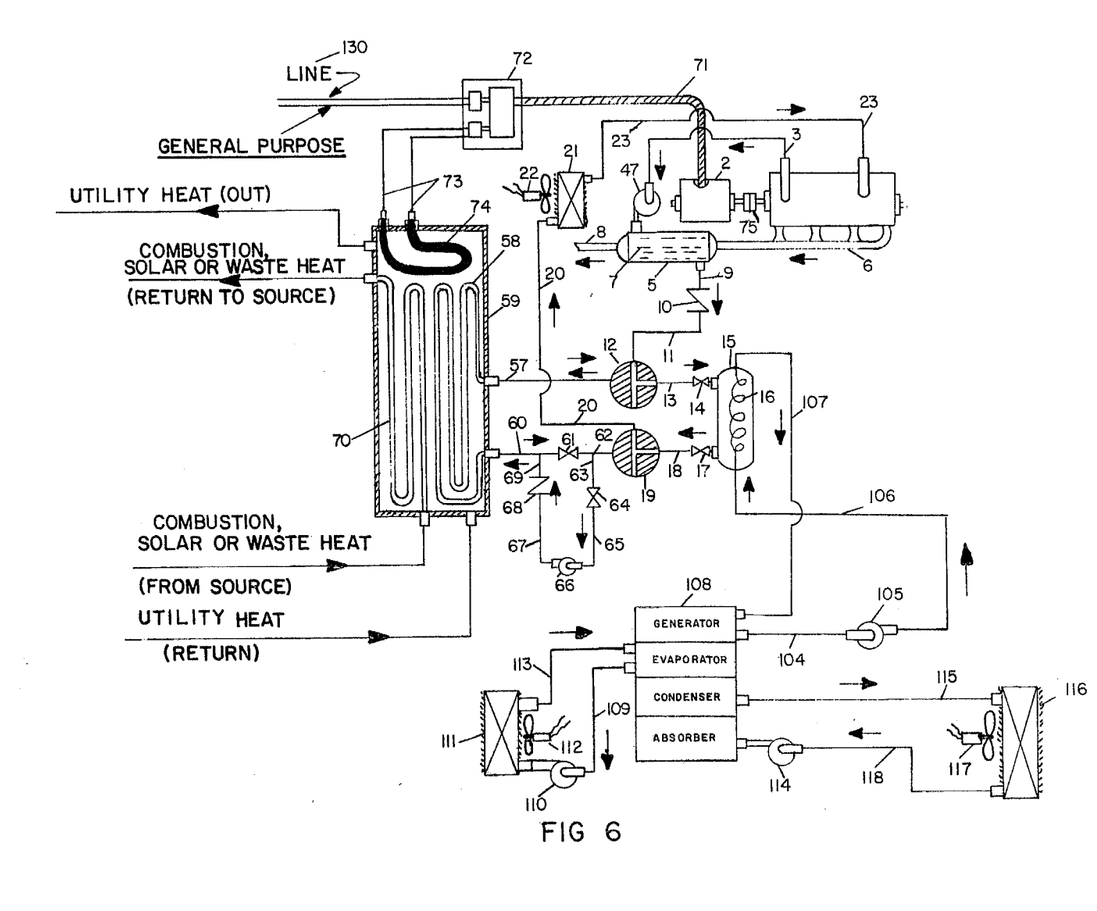
FIG. 6 is a schematic circuit drawing of Embodiment "C" of the invention.

In Embodiment "C" of the invention as shown in FIG. 6 heat energy supply to the system is in all respects as described for Embodiment "A", but the system's jet pump air conditioning unit has been replaced by an air conditioning unit of the absorption type. For the purpose of the specification the absorption type air conditioning unit shall be assumed to be of the lithium bromide—water cycle category, but equally feasible would be the substitution of a water-ammonia cycle unit. Since the theory and operating principles of absorption type air conditioning equipment is well known to those skilled in the art, it is not the intent of the specification to detail the internal workings of the absorption type air conditioning unit reflected in FIG. 6 of the drawings, but rather to illustrate the adaptability of this type of air conditioning unit to the total energy system of the invention as evidenced in the following: a pumping means 105 being integrated in a closed loop containing a heat transfer fluid (not shown) such as water is made to propel said heat transfer fluid through pipe 106 and through heat transfer coil 16 wherein the said heat transfer fluid receives heat in a manner as previously described. Leaving heat transfer coil 16, the heated fluid flows through pipe 107 and gives up a portion of its heat within the generator of the absorption type air conditioning unit 108, thereby vaporizing part of the water refrigerant in solution, separating it from the lithium bromide absorbent and thereby triggering the unit's cycle. The now lowered temperature heat transfer fluid under the influence of pumping means 105 is now returned to said pumping means through pipe 104 for the continuation of the heat transfer cycle.

In order to remove the waste heat of absorption of water into the solution as well as the waste heat of the load and the heat from the heat source, the following method as illustratively shown in FIG. 6 has been adopted—a closed loop containing a heat transfer fluid such as water and including a pumping means 114 propels said heat transfer fluid through coils normal to the absorber and condensor of the absorption air conditioning unit 108 wherein the previously referred to waste heats are transferred to the closed loop's heat transfer fluid and moved through pipe 115 to heat transfer coil 116 at which time the received waste heat is transferred to the ambient air via the medium of motor operated fan 117. The now cooler heat transfer fluid is then returned to pumping means 114 for continuance of the duty cycle via pipe 118.

For obtaining transfer of cooling effect created within the evaporator of the absorption air conditioning unit 108 to the space to be cooled, a closed loop filled with water or other heat transfer fluid is utilized. The said closed loop includes a heat transfer coil contained within the evaporator of the absorption air conditioning unit as one of its components and functions in the following manner—a pump 110 also a component of the closed loop draws a quantity of heat transfer fluid which has been chilled in the previously referred to coil within the air conditioning unit's evaporator to its suction side through pipe 109 and discharges said heat transfer fluid into heat transfer coil 111 wherein the heat load of the space to be cooled is transferred by motor operated fan 112 and heat transfer coil 111 to the contained heat transfer fluid which is now returned by pumping action through pipe 113 to the evaporator's heat transfer coil to be re-chilled and recycled as previously described.

Figure 7:
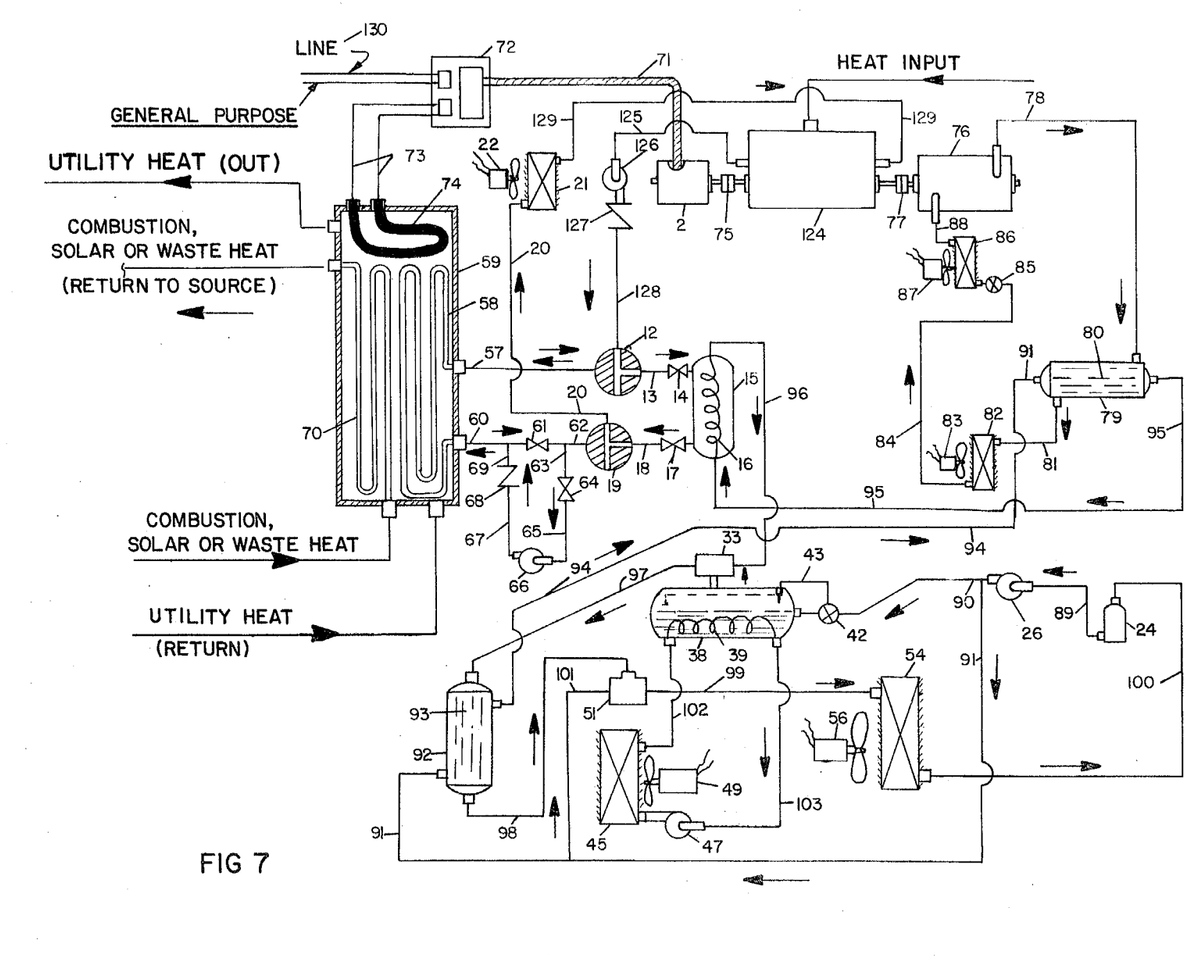
FIG. 7 is a schematic circuit drawing of Embodiment "D" of the invention.

In Embodiment "D" of the invention as reflected in FIG. 7 of the drawings, one salient change has been effected to details as shown in FIG. 5 (Embodiment "B" of the invention). This change involves the substitution of an external continuous combustion or waste heat engine of the Stirling type 124 for the internal comubstion type 135 shown in FIG. 5. Other differences between FIGS. 5 and 7 involve the routing of the heat transfer fluid flow from the driver to three way valve 12, and the return flow to the driver from three way valve 19.

In a functioning system as illustratively displayed in FIG. 7, a Stirling engine 124 of dual drive shaft extension is couplable by electric type clutches 75 and 77 to electric generator 2 and refrigeration compressor 76, and upon the activating of said engine 124, useful shaft work is produced for the performance of functional duty as is described for internal combustion engine 135 in Embodiment "B" of the invention.

In reclaiming waste heat emanating from the Stirling engine for distribution to heat exchanger 15 or tank 59, as may be desired, the following procedure is adopted—a coolant or heat transfer fluid contained in a closed loop of controllable flow distribution, having received heat within the cooler of the Stirling engine 124 is drawn to the suction side of pump 126 through pipe 125 and discharged through back check valve 127, pipe 128 and so to three way valve 12, from which point its flow and function is as previously dealt with in reference to Embodiment "A" of the invention. In the return flow of the cooler heat transfer fluid to the Stirling engine 124, said heat transfer fluid is propelled from three way valve 19 through pipe 20, heat exchanger coil 21 and re-enters the cooler of the Stirling engine 124 through pipe 129 for continuance of the heat transfer cycle. In the event that a minimal demand for heat energy as distributed by the last described circuit should exist, resulting in the heat transfer fluid being returned to the Stirling engine 124 at a temperature so high as to impair the operating function of said engine 124, a thermostatically controlled switch (not shown) would activate motor operated fan 22 thereby effecting removal of unwanted heat via the medium of ambient air in heat exchange with the heat transfer fluid passing through heat exchanger coil 21.

Figure 8:
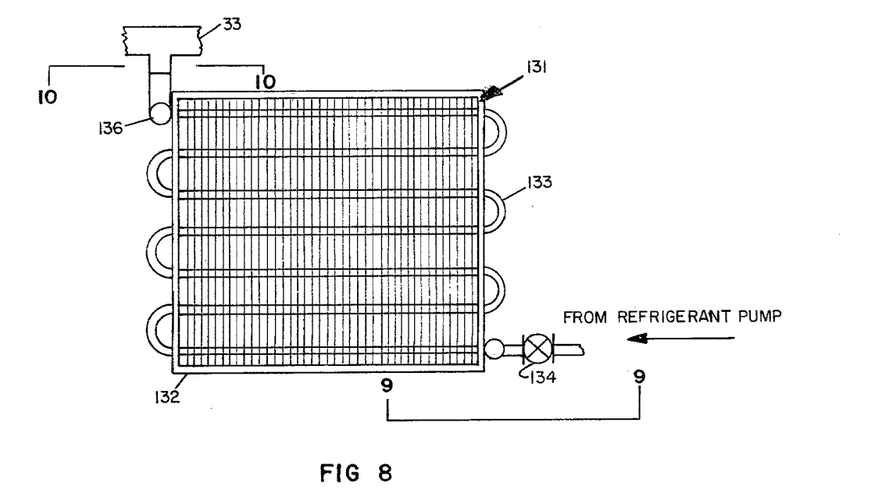
FIG. 8 is a front view of an alternative type of evaporator which may be used for the invention's jet pump air conditioning system.
Figure 9:
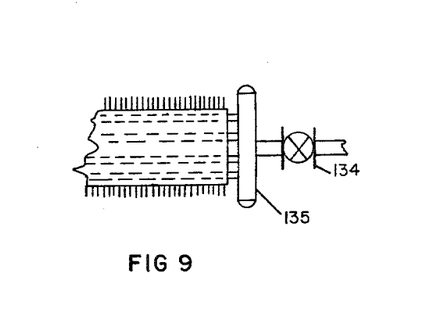
FIG. 9 is a fragmented bottom view taken on Line 9 of FIG. 8.
Figure 10:
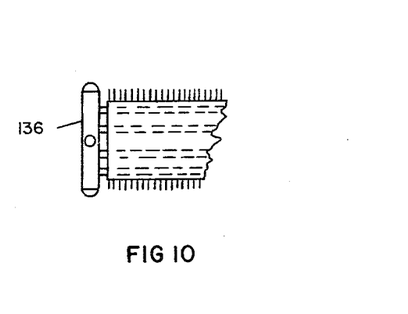
FIG. 10 is a fragmented top view taken on Line 10 of FIG. 8.

In FIGS. 8, 9 and 10 of the drawings, details of an alternative type of evaporator for the system's jet pump air conditioning unit is shown. Said evaporator, in general being identified and enumerated 131 is of the dry type and comprises a plurality of finned coils 133 with said coils 133 being integrated with inlet manifold 135 and outlet manifold 136 with said coils 133 being retained within a supporting frame 132.

In a functioning jet pump air conditioning unit the outlet manifold 136 of the evaporator 131 would be connected with the suction side of ejector 33 and liquid refrigerant propelled by pumping means 26 would be supplied at the evaporator's inlet manifold 135 in controlled amounts via flow regulating valve 134. Transfer of the heat load to the said evaporator 131 would be effected by flowing the air to be cooled across the finned coils 133 by such means as a motor operated fan (not shown). In considering the selection of the evaporator type, dry or in the drawings and specification. The said solvents, used in the capacity of refrigerants, are considered to be a desirable feature of the invention.

In FIG. 11 of the drawings, general properties of three selected solvents are presented all having constant boiling characteristics, with their boiling points falling in a range between Freon 113 and Freon 11 indicating desirably low condensing pressures and thereby extending the practicality of jet pump air conditioning systems in geographic locations where high temperatures of the condenser cooling flow are a rule rather than an exception.

Additionally, the utilization of the selected solvents as refrigerants would, under considered conditions of jet pump air conditioning system operation, render the inclusion of the liquid motivated ejector 51 within a system as shown in the drawings unnecessary. Other desirable features of the selected solvents when used as refrigerants in a jet pump air conditioning system include low energy requirements, low surface tension, low toxicity, non-flammability and compatability with the simple materials of construction required for a jet pump system as shown in the drawings.

Some further possible system variants and modifications to the particulars as shown in the drawings and described in the specification are as follows—the prime movers or drivers as previously discussed can be replaced by other heat engines such as a reciprocating steam engine, a steam turbine and/or a gas turbine all said heat flooded, for the system's jet pump air conditioning unit, experience has dictated that the dry type as last described is the most cost effective and lends itself most adequately to jet pump air conditioning systems utilizing such refrigerants as Freon 11, Freon 21, and Freon 114. It has also been found, however, that when using refrigerants with boiling points above that of Freon 11 (74.78° F.), a flooded type evaporator 38, as detailed in FIGS. 2, 3 and 4 of the drawings offers the advantages of simplified refrigerant flow control, lowered incidence of liquid "carry over", and output load stability.

Refrigerants generally considered to have functional capability in a jet pump air conditioning unit as dealt with in the specification include refrigerants bearing the following ASHRAE designation numbers: R113, R30, R610, R611 R11, R21 and R114. In prior art, jet pump system refrigerants R21 and R114 were considered to be of dubious capability due to their high condensing pressures at normal condensing temperatures and the inability of gas operated ejectors to operate against high back pressures. On the other hand liquid operated ejectors as utilized in the second stage of the jet pump air conditioning unit reflected in the drawings and specification operate with high efficiencies against back pressures equal to 25% of their motive pressure.

Additional to the use of the recognized refrigerants as previously citied, it has been found that a number of low priced solvents have excellent capability for function as refrigerants in a jet pump system of the type reflected engines having the capability of providing waste heat supply for utilitarian heating and/or the operation of a jet pump air conditioning system while driving an electric generator and/or a refrigeration compressor in accordance with the previously stated general outlines of the invention. The air cooled condensers shown in the drawings can be replaced with liquid cooled and/or evaporative condensers; staged gas and/or liquid motivated ejectors can be made a feature of the jet pump air conditioning system; and, condensing means can be interposed between any two ejectors.

Since all of these recounted variants and modifications, as well as many others are likely to occur to those skilled and versed in the art, all such variants and modifications, are considered to fall within the motivation, character and scope of the invention as defined in the following claims.

What is claimed is:

1. An improved total energy system including means for utilizing supplementary heats and comprising, in combination:

an electrical generator for the supply of electrical energy; a heat engine for driving said electric generator; means for collecting a portion of the waste heats of said heat engine; a heat operated air conditioning means; means for conveying said waste heats from said heat collecting means to said heat-operated air conditioning means for the purpose of supplying motive energy for said heat-operated air conditioning means; a heat storage means; means for conveying heat from said heat collecting means to said heat storage means; means for conveying heat from said storage means to said heat-operated air conditioning means; means for conveying heat from said storage means to a medium to be heated such as water in a building's hydronic heating system; means for transferring to the said heat storage means, heats supplementary to heats generated within the claimed total energy system, said heats having been transferred to said heat storage means then becoming available for purposes of utilitarian heating and the operation of a heat-operated air conditioning system.

2. The system of claim 1 wherein the said heat-operated air conditioning means is of the jet pump type and comprises:

a first loop containing a refrigerant; a pumping means for propelling said refrigerant in liquid phase; a first heat exchange means whereby heat is transferred to the said refrigerant in order to condition the said refrigerant to a required circumstance of temperature and pressure in vapor phase; an evaporator means; a second pumping means, said second pumping means being an ejector of the gas motivated type, with said motive gas being the said refrigerant in vapor phase, said second pumping means having in purpose the abstraction of a quantity of refrigerant contained within said evaporator means at a low absolute pressure, thereby creating a required cooling effect in the said evaporator means; a second heat exchange means, said second heat exchange means acting to receive the hot refrigerant vapor being discharged by said second pumping means, and by exchange with the said liquid refrigerant being propelled by said first pumping means, return a portion of the heat contained in the said hot refrigerant vapor for reuse as motive energy; a third pumping means, said third pumping means being an ejector of the liquid motivated type, said motive liquid being the said refrigerant in liquid phase being propelled by said first pumping means, and thereby causing the said third pumping means to create a low pressure area at its suction side for receiving the said hot refrigerant being discharged from said second pumping means, and raising the pressure of the said hot refrigerant to its condensing pressure; a condenser means, said condenser means receiving the refrigerant being discharged from said third pumping means, and abstracting a portion of heat from the said refrigerant at condensing pressure and thereby returning the refrigerant to liquid phase; a liquid storage means maintaining a reservoir of liquid refrigerant for supplying said first pumping means; a flow control means for apportioning refrigerant supply from said first pumping means to said evaporator means; piping means serving to interconnect all previously said means and maintain all said means in flow relationship; a second loop containing a heat transfer fluid and comprising: a pumping means for said heat transfer fluid, a heat transfer coil means whereby a portion of the heat content of the said heat transfer fluid means is transferred to a cool refrigerant contained within the said jet pump air conditioning system's said evaporator means; a second heat transfer coil means, whereby heat from a space to be cooled is transferred to the said heat transfer fluid; piping means for interconnecting all said means and maintaining all said means in flow relationship.

3. The system of claim 1 wherein the said heat operated air conditioning means is of the absorption type incorporating the classically required components of generator, evaporator, condenser and absorber; external means for delivering motivating heat energy to the said absorption type refrigeration means; external means for the removal of waste heats from the said absorption type refrigeration means; and, external means for transferring the heat load of the space to be cooled to the said absorption type refrigeration means, said external means comprising:

a first loop containing a heat transfer fluid; a pumping means for propelling said heat transfer fluid within the said loop; a first heat transfer means whereby heat is transferred to the said heat transfer fluid for delivery to the generator of the said absorption refrigeration means in order to furnish motivating energy; piping means interconnecting the said component means of the said loop and the said absorption type refrigeration means, and thereby maintaining all said means in flow relationship, a second loop containing a heat transfer fluid; a pumping means for propelling said heat transfer fluid in circulating flow, including passage through the absorber and condenser of the said absorption type refrigeration means, wherein waste heats are transferred to the said heat transfer fluid; a heat exchange means whereby said waste heats removed from the absorber and condenser of the said absorption type refrigeration means and transferred to the heat transfer fluid, are removed from the said heat transfer fluid; piping means interconnecting all said component means of the said loop and maintaining said component means in flow relationship; a third loop containing a heat transfer fluid; a pumping means for propelling said heat transfer fluid in circulating flow through the evaporator of the said absorption type refrigeration means and wherein the said heat transfer fluid is chilled; a heat exchanger means whereby heat from a space to be cooled is transferred to the said heat transfer fluid; piping means interconnecting all said component means of the said third loop and maintaining said component means in flow relationship.

4. The system of claim 1 with the following optional additional features, wherein in addition to driving said generator for the production of electrical energy, the said heat engine is made to drive a refrigeration compressor, said refrigeration compressor being integrated in a modified mechanical vapor compression cycle refrigeration system utilizing such refrigerant as Freon 22 and comprising:

said compressor means whereby flow of refrigerant is maintained within the system and whereby the superheated refrigerant being received at the suction side of the said compressor is raised in temperature and pressure prior to discharge from said compressor's discharge outlet; a first heat exchange means whereby a portion of the higher temperature heat contained in the refrigerant gas being discharged from the said compressor means is passed in heat exchange with the refrigerant of a heat-operated air conditioning system contemplated in claim 1 and whereby an additional supply of waste heat is made available for the operation of a heat-operated air conditioning system as contemplated in said claim 1; a condenser means wherein the discharged refrigerant gas is returned to liquid phase; a flow regulating valve through which the liquid refrigerant is passed for expansion to a gaseous state; an evaporator means wherein a cooling effect is created by the evaporation of the refrigerant and whereby the heat load of a medium to be cooled such as air in a building is transferred to a chilled refrigerant; piping means to interconnect all aforesaid means and to maintain said means in a working flow relationship.

5. The system of claim 2 including a mechanical vapor compression cycle refrigeration system having a compressor, and wherein an additional means of waste heat supply to the heat-operated jet pump air conditioning system is interposed between the said first and second heat exchanger means of said heat operated jet pump air conditioning system, said heat supply being a portion of the waste heat rejected by the mechanical vapor compression cycle refrigeration system, and wherein the higher temperature heat contained in the refrigerant gas being discharged by the compressor is passed in heat exchange with the said refrigerant of the heat-operated jet pump air conditioning system.

6. The system of claim 2 wherein the said evaporator means is of the flooded type comprising:

a tank means for the containing of a controlled quantity of a liquid refrigerant; a tank inlet means for introducing said refrigerant to said tank means; a connecting means for accommodating a liquid refrigerant level sensing means; a plurality of woven wicks; a supporting means for said woven wicks with said woven wicks serving to expose an extended liquid surface to a vacuum created at the suction side of an ejector means as incorporated in the system of claim 2; a tank outlet means for connecting to the suction side of said ejector means incorporated in the system of claim 2 and whereby a portion of the refrigerant contained within the said tank means is withdrawn under a condition of low absolute pressure, thereby creating a cooling effect within the said evaporator means; a heat transfer coil means contained within the said tank means, said heat transfer coil means being immersed in the liquid refrigerant within the said tank means and whereby the heat load of a space to be cooled is transferred to the said evaporator means when the said evaporator means is incorporated within a system as claimed in claim 2.

7. The system of claim 2 wherein a group of commercially available solvents are utilized as refrigerants in the claimed system.

8. The system of claim 7 wherein a said solvent claimed for use as a refrigerant is in composition an azeotrope comprising 89% (weight) Freon 113 and 11% (weight) Acetone, said solvent being commercially available under the trademark of Freon TA.

9. The system of claim 7 wherein a said solvent claimed for use as a refrigerant is in composition an azeotrope comprising 50% (weight) Freon 113 and 50% (weight) methylene chloride and is commercially available under the trademark of Freon TMC.

10. The system of claim 7 wherein a said solvent claimed for use as a refrigerant is in composition a blending of 94.05% (weight) Freon 113, 5.7% (weight) methanol and 0.25% (weight) Nitromethane and is commercially available under the trademark of Freon TMS.

11. The system of claim 1 wherein the said heat engine is of the internal combustion type.

12. The system of claim 1 wherein the said heat engine is of the Stirling type.

* * * * *